(12) United States Patent
De Mott

(10) Patent No.: US 7,792,272 B2
(45) Date of Patent: Sep. 7, 2010

(54) TECHNIQUE FOR COMMUNICATING COMMANDS AND PARAMETERS IN AN INFORMATION ASSISTANCE SYSTEM TO PROVIDE SERVICES

(76) Inventor: Byron De Mott, 6990 S. Oster Rd., Woodburn, OR (US) 97071

(*) Notice: Subject to any disclaimer, the term of this patent is extended or adjusted under 35 U.S.C. 154(b) by 1432 days.

(21) Appl. No.: 11/120,847

(22) Filed: May 3, 2005

(65) Prior Publication Data

US 2006/0251233 A1    Nov. 9, 2006

(51) Int. Cl.
*H04M 3/00* (2006.01)
*H04M 5/00* (2006.01)
*H04M 3/42* (2006.01)

(52) U.S. Cl. .............................. 379/265.01; 379/203.01; 379/207.15; 379/265.02

(58) Field of Classification Search ............ 379/203.01, 379/88.13, 88.19, 265.02, 88.2, 207.15, 218.01, 379/265.01; 455/414, 415

See application file for complete search history.

(56) References Cited

U.S. PATENT DOCUMENTS

| 2003/0032409 | A1* | 2/2003 | Hutcheson et al. | 455/414 |
| 2005/0220288 | A1* | 10/2005 | Huey | 379/265.02 |
| 2006/0023849 | A1* | 2/2006 | Timmins et al. | 379/88.19 |
| 2006/0029191 | A1* | 2/2006 | Miller et al. | 379/88.13 |
| 2006/0227962 | A1* | 10/2006 | Dammrose | 379/265.02 |

* cited by examiner

*Primary Examiner*—Thjuan K Addy
(74) *Attorney, Agent, or Firm*—Sofer & Haroun, LLP

(57) ABSTRACT

A message is received from a first device in an information/call center, wherein the message identifies a second device in an information/call center capable of providing a requested service and includes a command directed at the second device to activate the service. The first device may comprise, e.g., an operator terminal. The message may comprise a uniform resource locator (URL), and may additionally identify a software application residing on the second device. The message may also include one or more parameters used to provide the requested service. The command is retrieved from the message, and the command is transmitted to the second device, thereby causing the second device to provide the service.

20 Claims, 14 Drawing Sheets

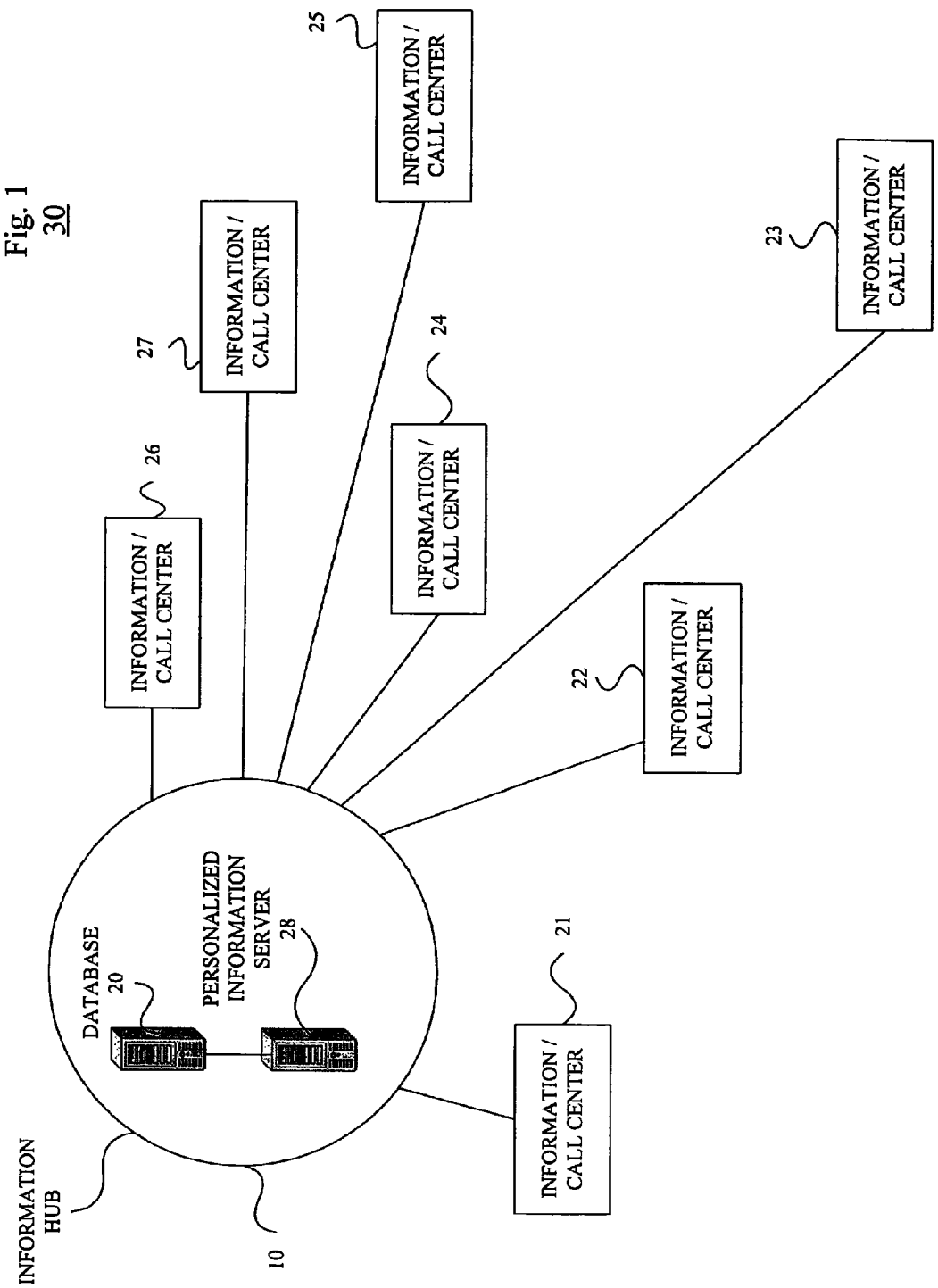

440

| | TIME (441) | CALL ID (442) | EVENT STATE (443) | EVENT STATE VALUE (444) | PARAMETERS (445) |
|---|---|---|---|---|---|
| 462 | 10-05-YYYY/ 09:30:07 | CALL_ID1 | CALLSTATE | STATE | (null) |
| 463 | 10-05-YYYY/ 09:30:08 | CALL_ID1 | OWNER | Operator Terminal | (null) |
| 464 | 10-05-YYYY/ 09:30:33 | CALL_ID1 | SERVICESTATE | Activate | Address1; Username!; Password1; 00:00:00; 06-21-YYYY; 23:59:59; 06-23-YYYY; |
| 465 | 10-05-YYYY/ 09:30:36 | CALL_ID1 | OWNER | Electronic Messaging Gateway | (null) |
| 466 | 10-05-YYYY/ 09:30:37 | CALL_ID1 | SERVICESTATE | START | (null) |
| 467 | 10-05-YYYY/ 09:38:58 | CALL_ID1 | SERVICESTATE | END | (null) |
| 468 | 10-05-YYYY/ 09:38:59 | CALL_ID1 | OWNER | Operator Terminal | (null) |

805 http: // network1 / engateway / read_email / time_range_filter / CALL_ID1 / 10-05-YYYY / 09:30:33

TECHNIQUE FOR COMMUNICATING COMMANDS AND PARAMETERS IN AN INFORMATION ASSISTANCE SYSTEM TO PROVIDE SERVICES

FIELD OF THE INVENTION

The invention relates to a communications system and method, and more particularly to a system and method for facilitating the provision of services to users of an information assistance service.

BACKGROUND OF THE INVENTION

In this information age, people need to be well informed and organized to effectively carry out day-to-day activities, especially when they are traveling and away from their "home" base where they normally conduct their business. As a result, use of mobile devices which facilitate mobile communications, such as wireless telephones, is ubiquitous.

Wireless phones conveniently allow users while traveling to call and communicate with other people. In case a user cannot remember the telephone number of a contact or it is not handy, he/she can call an information assistance provider for assistance which includes, e.g., an operator, a voice server, etc. To that end, an expansive network of communication call centers has been established which provides users with nationwide assistance. Some information assistance providers offer enhanced services in addition to information assistance. For example, a user may call an information assistance provider to obtain directions and other information concerning, e.g., restaurants, theaters, etc., or to make a reservation or purchase. In some cases, a user may call an information assistance provider to receive voice email service, i.e., to access his/her email accounts and hear selected email messages.

To receive a particular enhanced service, e.g., a voice email service, a user typically dials a number, e.g., a 1-800 number, that is specific to the desired service. In other words, the user typically dials a first number to access his/her email accounts, a second number to receive travel directions, etc.

After receiving an enhanced service, a user may wish to return to an operator to request, e.g., information assistance. Unless the operator happens to have assisted that particular user previously during the same call, the operator typically has no way of knowing that the user received an enhanced service. This lack of continuity can cause the interaction between the information assistance provider and the user to be unleasant for the user. An operator's lack of knowledge about a call's history is particularly problematic where a user requests an enhanced service such as voice email service, but is prevented from receiving the service due to a communication problem. In many such cases, the frustrated user is simply reconnected to an operator who, having no knowledge of the user's situation, simply states, "Hello, may I help you?" If the user wishes to make the operator aware of the user's failed attempt to connect to the enhanced service, the user must himself/herself provide an explanation to the operator.

SUMMARY OF THE INVENTION

The invention overcomes the prior art limitations by allowing users to call a single access number to receive a variety of information assistance services in an efficient manner. In an illustrative embodiment of the invention, when a call is received at an information/call center from a user, an operator is connected to the call and interacts with the user. If the user requests a desired information assistance service, e.g., a voice email service, the operator enters the request specified by one or more parameters at his/her operator terminal. The one or more parameters are stored in association with an identifier of the call in a database. A server in the information/call center capable of providing the desired service is identified. A directive including the identifier of the call and a uniform resource locator (URL) addressed to the server is generated. The URL may identify an application of the server providing the requested service. A message including the directive is sent to a device, e.g., a voice gateway unit (VGU), which disseminates the directive destined to the server. In response to the directive, the server accesses and retrieves from the database the one or more parameters based on the identifier in the directive, and provides the desired information assistance service based on the one or more parameters.

BRIEF DESCRIPTION OF THE DRAWINGS

Further objects, features and advantages of the invention will become apparent from the following detailed description taken in conjunction with the accompanying drawing showing an illustrative embodiment of the invention, in which:

FIG. 1 illustrates a communications system including information/call centers, in accordance with the invention;

FIG. 6 illustrates a file that may be created and maintained by a call tracker to store event messages, in accordance with an embodiment of the invention;

FIG. 10 shows an example of a uniform resource locator (URL), in accordance with an embodiment of the invention;

DETAILED DESCRIPTION

Figure 2A:
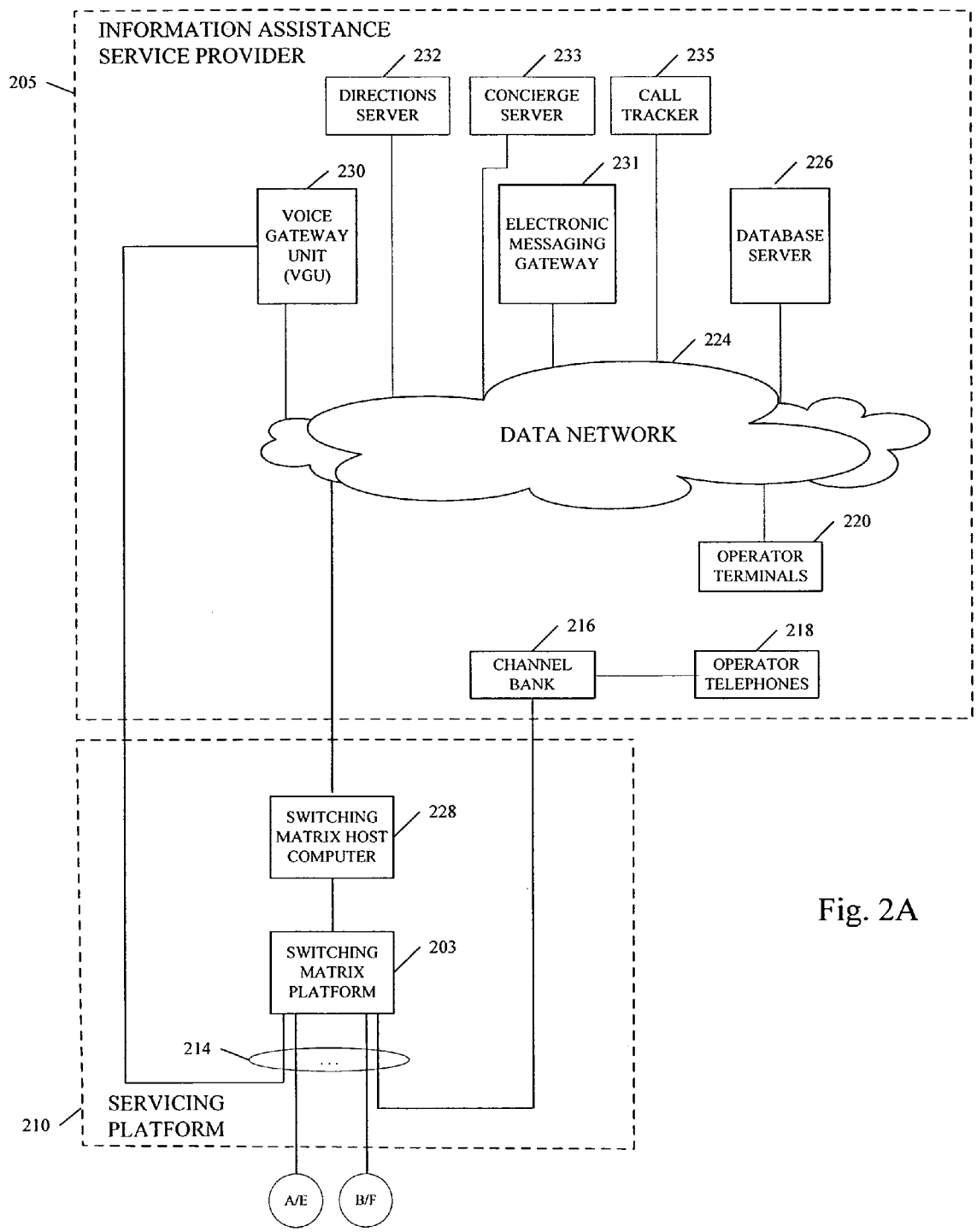
FIGS. 2A and 2B are block diagrams of components of the communications system of FIG. 1.

The invention is directed to facilitating the provision of enhanced information services to a user of an information assistance service. In an illustrative embodiment of the invention, a call is received from a user, e.g., by the switching matrix platform, and an operator at a terminal is connected to the call and interacts with the user. If the user requests an enhanced service, e.g., a voice email service, the operator enters the request at the operator terminal. The operator terminal transmits an event message, which records the request, to a database referred to as a call tracker. The event message may include one or more parameters received from the user pertaining to the requested service. The operator terminal identifies a server, or an application, operating in the information/call center that is appropriate to provide the requested service, and generates a uniform resource locator (URL) corresponding to the identified server and application. The operator terminal transmits to a voice gateway unit (VGU) a message, referred to as a "service request message," containing the URL. The VGU receives the service request message and extracts the URL therefrom. The VGU then sends the URL directed to the appropriate server. The server receiving the URL, in response, activates the application and/or service specified therein. The server also accesses the call tracker to obtain the parameters required to provide the requested service.

To facilitate tailoring the enhanced service to an individuals' needs, one or more folders may be maintained for a user, based on which an enhanced service may be rendered to the user. For example, an email folder may be created and maintained for a user to allow the information assistance provider to provide a voice email service. An email folder stores a user's email information, e.g., data pertaining to one or more email accounts that the user wishes to access via the information assistance service. Such email accounts were previously established by the user with such email service providers (ESPs) as AOL, Hotmail, etc., which are unaffiliated with the present information assistance service provider. With the email folder in place, when the user accesses his/her email folder, e.g., by calling, the information assistance service, the user may be informed of any newly arrived email messages in his/her various email accounts, may be able to learn the content of an email message and reply thereto, and may take advantage of other related services offered by the information assistance provider, as will be fully described below. An example of a voice email service is described in co-pending, commonly assigned application Ser. No. 10/903,454, filed on Jul. 30, 2004, incorporated herein by reference.

An email folder for a user may be maintained by the information assistance service in association with an identifier of the user, e.g., the user's telephone number. Thus, in this particular illustrative embodiment, when an information assistance call is received, the subject service locates the folders associated with the caller based on an automatic number identification (ANI) associated with the call. As is well known, the ANI identifies the telephone number of the communications device from which the call originates. However, it should be noted that a user identification (ID), password, PIN, mother's maiden name, user voiceprint, etc. may be used in combination with, or in lieu of, an ANI to identify a user. For example, use of a voiceprint to identify a user is disclosed in copending, commonly assigned U.S. application Ser. No. 10/403,207 filed on Mar. 31, 2003, incorporated herein by reference.

Another folder may include a user profile containing preferences of the user associated therewith, as described in co-pending, commonly assigned application Ser. No. 10/323,287, filed on Dec. 19, 2002, incorporated herein by reference. A user may specify in a user profile his/her preferred types of events, areas of interest, food, goods, services, manufacturers, merchants and other personal preferences, e.g., preferred music, fashion, sports, restaurants, seating on a plane, frequent flyer number, frequent stay number, sizes of jackets, etc. Such a profile may be used by a server to tailor the content of information delivered automatically to the user as soon as the information becomes available. The user may also specify in the profile the preferred method of handling his/her information assistance call, e.g., use of a special skilled operator, such as a Spanish speaking operator, to answer such a call.

Thus, by using a user profile, the user is automatically provided with an individualized service, without the need of otherwise repeating the preferences each time when calling an operator to obtain information and assistance.

The personal preferences in a user profile may be specified by a user during registration with the information assistance service via a phone call, for example, in response to registration questions posed by an operator or a voice response unit (VRU). Personal preferences may also be entered and changed via a web page. A user will typically also register the phone number of each phone that may be used to call the information assistance service, and identify the type of phone as a wireline or wireless phone.

FIG. 1 illustrates a communications system for providing, inter alia, a personalized voice email service in accordance with the invention. This communication system includes wide area network (WAN) 30 covering an extensive area. WAN 30 may be an Internet-based network such as the World Wide Web or a private intranet based network. WAN 30 connects operators dispersed throughout a wide coverage area in information/call centers 21 through 27. It should be noted that the term "operators" used herein broadly encompasses entities that are capable of providing assistance in a telecommunications environment, including without limitation human operators, voice response/recognition capabilities, web-/WAP-enabled operator services, and other automated and electronic access. One or more information hubs 10 are also included in WAN 30. An information hub 10 includes one or more personalized information servers 28 which are accessible by the operators in the system, and one or more databases 20 in which users' email, profile, and other folders may be stored and maintained. Such folders may also be stored locally at one or more of the information/call centers. The folders and information at different centers are synchronized. Synchronized databases provide necessary backup as well as support to roaming mobile device users.

Figure 2B:
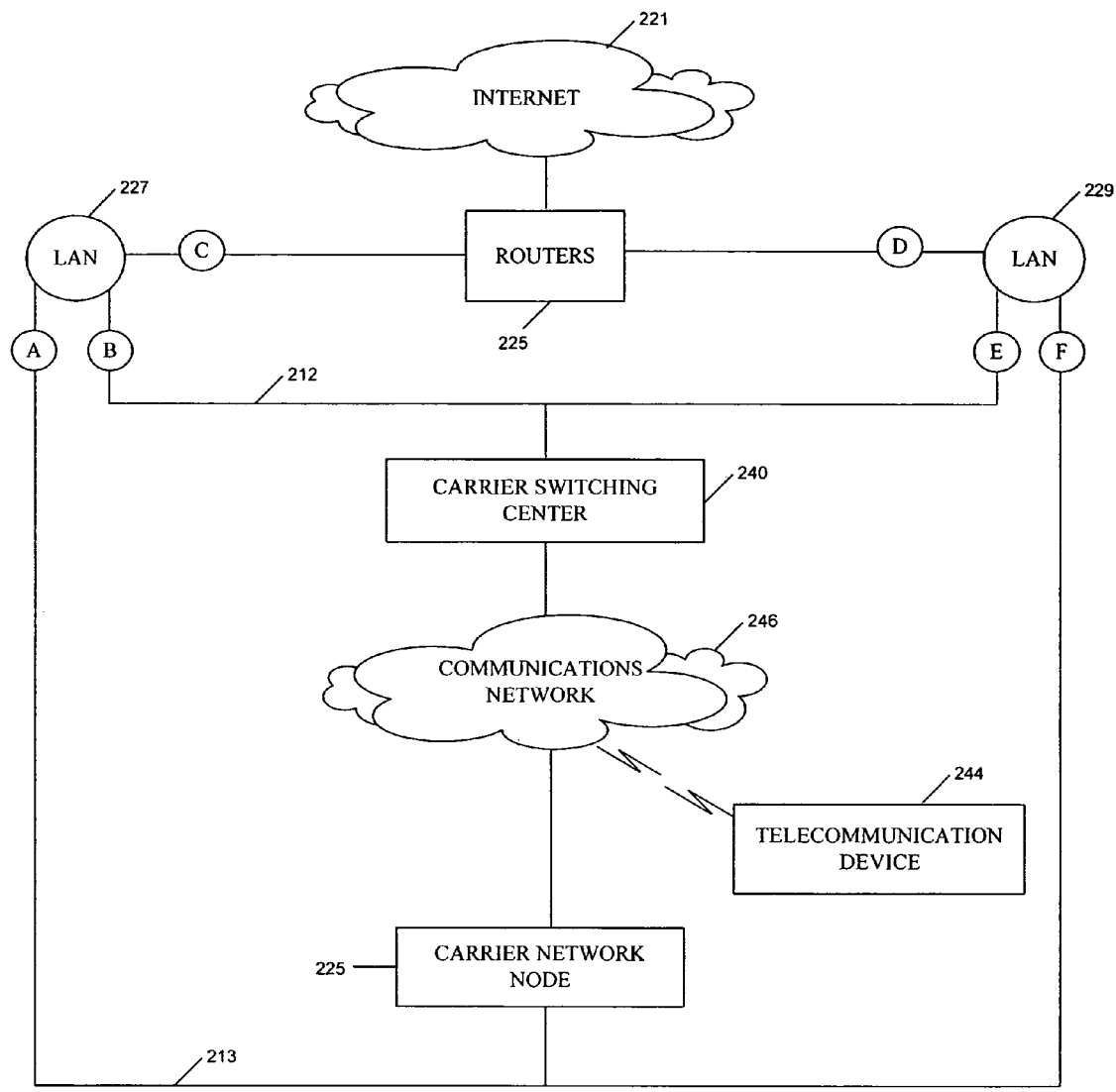

Referring to FIGS. 2A and 2B, information/call center 200 (which generically represents one of aforementioned information/call centers 21 through 27) is attended by operators, which includes information assistance service provider 205 and servicing platform 210. It should be noted that even though both provider 205 and servicing platform 210 appear in the same figure, they may or may not be located in the same geographic area. Servicing platform 210 comprises switching matrix host computer 228, and switching matrix platform 203 which is connected via T1 communication links 214 to, among others, voice server 230 and channel bank 216 in provider 205.

Channel bank 216 is used to couple multiple operator telephones 218 to platform 203. The operators in center 200 are further equipped with operator terminals 220, each of which includes a video display unit and a keyboard with associated dialing pad. Operator terminals 220 are connected over data network 224 to one or more database server(s) 226 (although only one is shown here). Database server 226 provides access to, among others, directory information from multiple sources. Database server 226 enables the operator to search directory information not just by name and address (sometimes city or area code) of a desired party, but also by type of goods/services and/or geographical region of a desired entity.

Data network 224 further connects to voice gateway unit (VGU) 230 and switching matrix host computer 228, which in turn is connected to switching matrix platform 203 via a data link. Data network 224 includes, but is not limited to, local area network (LAN) 227, best seen in FIG. 2B. LAN 227 may connect to other similar remote LANs 229 to form WAN 30 in FIG. 1. LANs 227 and 229 are connected to one another and to Internet 221 via routers 225.

A user's telephone, computer, PDA or other telecommunication device 244 communicates via communications network 246 which is connected to carrier network node 242 and carrier switching center 240. T1 voice links 212 provide connection between the information/call center's switching matrix platform 203 and carrier's switching center 240, through which incoming information service calls are received. T1 voice links 212 further provide connection to the carrier switching center 240 through which outgoing calls are placed over communications network 246 (which network may be different than that used for incoming calls). Similarly, T1 data links 213 provide a signaling connection between the information/call center's node (not shown) and carrier network node 242, through which incoming and outgoing signaling messages are transported. The information/call center node is contained within switching matrix platform 203, but one with skill in the art will appreciate that the information/call center node could also be a physically distinct component.

The operation of switching matrix platform 203 is governed by computer-readable instructions stored and executed on switch matrix host computer 228. In this illustrative embodiment, platform 203 includes, inter alia, arrays of digital signal processors (DSPs). These DSPs can be programmed and reprogrammed to function as, among other things, call progress analyzers (CPAs), call progress generators (CPGs), multi-frequency (MF) tone generators/detectors, dual-tone multi-frequency (DTMF) generators/detectors, or conference units, depending on the demand placed on center 200 and platform 203 for each corresponding function.

Data network 224 may additionally be connected to one or more servers, comprising various applications configured to provide enhanced services in response to user requests, such as electronic messaging gateway 231, directions server 232, and concierge server 233. It should be noted that although three such servers are illustrated in FIG. 2A, any number of such servers may be included within information/call center 200.

Electronic messaging gateway 231 manages a voice email service provided to users of the information assistance provider. In particular, gateway 231 allows users to access email messages in one or more email accounts based on data stored in the user's email folder (described above). Gateway 231 is configured to communicate with one or more email servers, which may be, e.g., POP3 (Post Office Protocol Version 3) or IMAP (Internet Message Access Protocol) compliant email servers. For example, in response to signals from terminal 220, gateway 231 may initiate Internet access and communicate with email servers operated by such ESPs as AOL, Hotmail, etc. Gateway 231 allows one or more email messages in a user's specified email accounts to be downloaded from the email servers. Selected portions of the messages or data may be transmitted to terminal 220 for presentation to a human operator who in turn conveys the same to the user, or to voice server 230 which communicates the same to the user in automated voice. Gateway 231 may include one or more "message filter" applications that allow a user to control which email messages are presented to him/her. For example, a user may specify that only email messages received during a specified time period are to be downloaded and presented to the user.

Directions server 232 provides directions from a specified origination location to a desired destination, in response to a user request. For example, directions server 232 may comprise a daemon process which communicates with a remote map server at a predetermined Uniform Resource Locator (URL) to obtain maps and directions from a given origination point to a given destination point. Directions obtained by directions server 232 may be provided to a user in their entirety, or may be stored and provided to the user one direction at a time as requested by the user. An example of a directions server is provided in commonly assigned U.S. Pat. No. 6,580,904, issued on Jun. 17, 2003 to Cox et al., which is incorporated herein by reference.

Concierge server 233 manages a teleconcierge service provided to users of the information assistance provider. Teleconcierge services encompass a wide variety of services that are provided by telephone to satisfy a user's needs. For example, a call may be received from a user requesting a restaurant reservation, a flight reservation, a reservation or purchase of concert tickets, etc. Upon determining that the user is requesting a concierge service, the operator causes concierge server 233 to be activated. The operator may also refer to a user profile maintained for the user and note any preferences, such as the guest's preference for outdoor dining. With the assistance of concierge server 233, the operator then suggests a service, an event or restaurant in accordance with the guest's desires and preferences. Should the suggestion be satisfactory, the operator makes the necessary reservations and informs the user of the reservation details. An example of a teleconcierge service is described in commonly assigned U.S. Pat. No. 6,775,371, issued Aug. 10, 2004 to N. Elsey et al.

Users of a particular telephone carrier may dial, speak or otherwise communicate predetermined access digits, access codes or retail numbers, or input a predetermined address or a URL established for information assistance by that company. The instant example assumes that the user dials, e.g., "411," "*555," "555-1212," "1-800-555-1212," "00," or other designated access numbers. The participating telephone company's own switching system will then reroute the call to information/call center 200 (via a T1 channel), where it appears as an incoming call.

Automatic call distribution (ACD) logic is used to queue (if necessary) and distribute calls to operators in the order in which they are received, and such that the call traffic is distributed evenly among the operators. In other embodiments, other distribution logic schemes may be utilized, such as skills-based routing based on, e.g., a preferred call handling method specified by a user profile, or a priority scheme for preferred callers. The queue is maintained by switching matrix host computer 228.

Selected events occurring during an information/assistance call are recorded by call tracker 235. For example, with respect to a given call, call tracker 235 may record when the call is received by switching matrix platform 203, which servers and/or applications interact with the user during the call, which services are provided to the user, etc. Upon the occurrence of a selected event during a call, an "event message" conveying information about the event is transmitted to call tracker 235. Call tracker 235 collects and stores information conveyed in the event messages, e.g., in a database. The information stored in call tracker 235 is accessible to various devices and applications within information/call center 200—for example, in response to a query as to the current status of a particular call.

In this illustrative embodiment, an "event" is defined by a pair of variables. The first variable, referred to as an "event state indicator," characterizes an event by category. For example, initiation and termination of a call within information/call center 200 are related events within a single category referred to as "CALLSTATE" events. The second variable, referred to as an "event state value" specifies more precisely the event that occurs, e.g., "START" when a call is initiated and "END" when a call is terminated.

Set forth below in Table 1 are examples of event state indicators and the corresponding event state values that may be included in an event message:

TABLE 1

| Event State Indicator | Event State Value |
| --- | --- |
| CallState | Start |
| | End |
| Owner | The identity of the service asserting ownership |
| ServiceState | Activate |
| | Start |
| | End |
| | Error_termination |

Referring to Table 1, an event message including a "CALLSTATE" event state indicator and a "Start" event state value signifies that a call has been received within information/call center 200. An event message including a "CALLSTATE" event state indicator and an "End" event state value indicates that the call has been terminated.

An event message comprising an "OWNER" event state indicator signifies that a particular server or application within information/call center 200 has been engaged to service the call. Such an event message includes an event state value comprising the name, or other indicator, of the particular server or application asserting "ownership" of the call.

An event message comprising a "SERVICESTATE" event state indicator signifies that an event pertaining to a service has occurred. A corresponding event state value "Activate" indicates that a request to initiate the service in question is being made. the event message may include activation parameters. If the corresponding event state value is "Start," the server or application appropriate to providing the service has been activated and started to service the call. If the corresponding event state value is "End," the server or application has completed the service and has disconnected from the call. If the event state value is "Error_Termination," an error has occurred and the service has been terminated.

Figure 3:
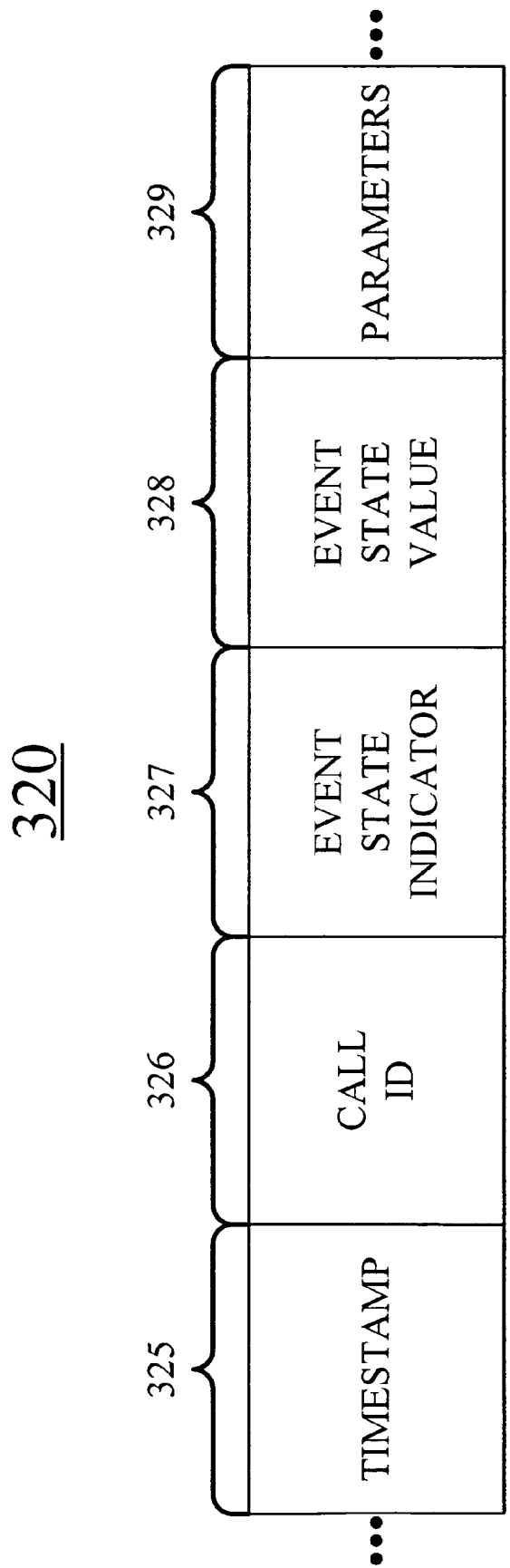
FIG. 3 illustrates an example of an event message, in accordance with an embodiment of the invention.

FIG. 3 illustrates an example of an event message that may be transmitted to call tracker 235 upon the occurrence of a selected event, in accordance with an embodiment of the invention. Event message 320 comprises five fields 325-329. Field 325 is used to hold a timestamp reflecting the time when the event message is created. Field 326 is used to hold a unique identifier (referred to as a "call ID") associated with a call. A call ID may comprise, e.g., a unique call sequence number, which is assigned by switching matrix platform 203 to a received call. Field 327 is used to hold the aforementioned event state indicator describing the respective event. Field 328 is used to hold the aforementioned event state value specifying the status of the event. If message 320 conveys any parameters, the parameters may be included in field 329.

Figure 4:
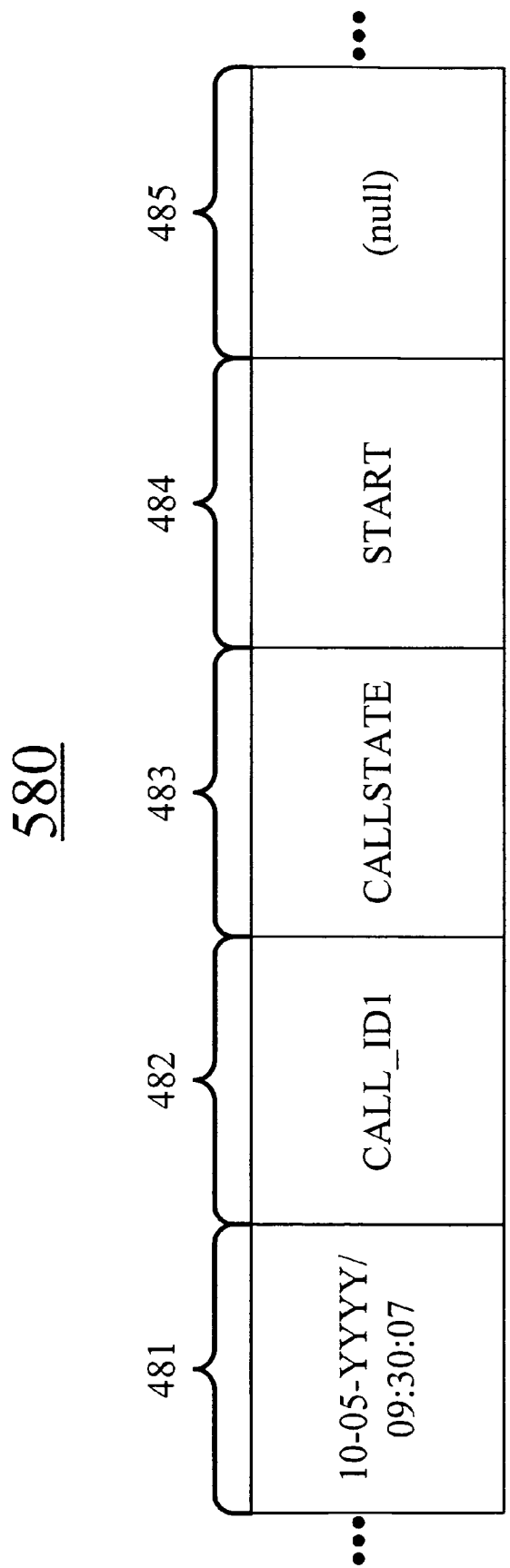
FIG. 4 illustrates another example of an event message, in accordance with an embodiment of the invention.

By way of example, suppose that a call is received from a user named Mr. Mozota. When switching matrix platform 203 receives the call, platform 203 generates an event message such as that shown in FIG. 4. Platform 203 records a timestamp in field 481, in this instance "10-05-YYYY/09:30:07". Platform 203 enters a call ID for the call in field 482, in this instance "CALL_ID1." Event state indicator field 483 contains "CALLSTATE," indicating that a CALLSTATE-type event has occurred. Event state value field 484 contains "START," indicating that the call has been received. Field 485 is left unused, since this particular message does not require the transmission of any parameters. Platform 203 transmits event message 580 to call tracker 235. It should be noted that when the call is later terminated, platform 203 transmits to call tracker 235 another event message indicating that another CALLSTATE-type event has occurred, and specifying the event state value to be "END."

Figure 5:
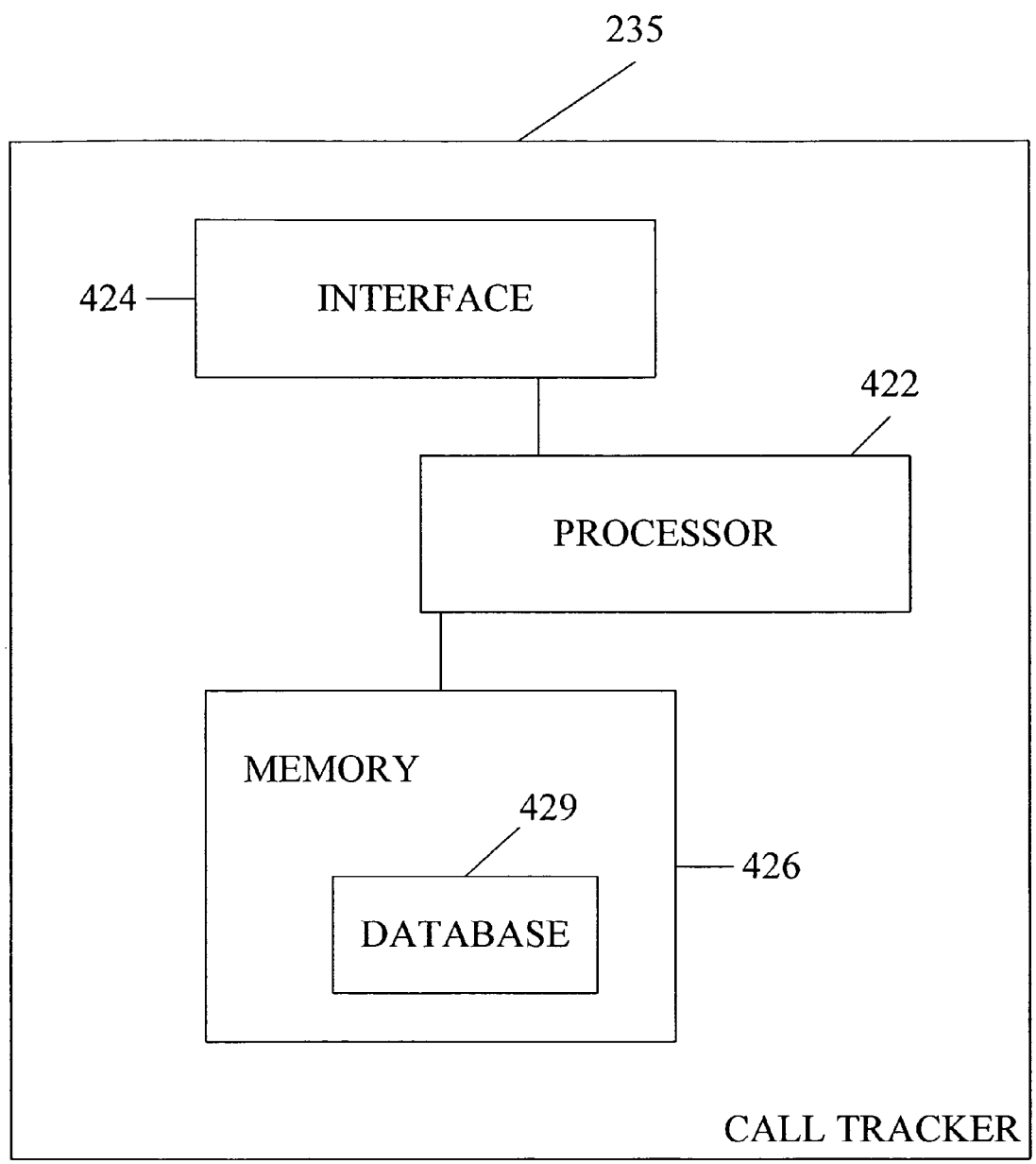
FIG. 5 illustrates components of a call tracker, in accordance with an embodiment of the invention.

FIG. 5 illustrates components of call tracker 235, in accordance with an embodiment of the invention. Call tracker 235 comprises processor 422, interface 424 and memory 426. Memory 426 may include a mechanism for long-term storage such as, e.g., disk drives. Processor 422 receives event messages, e.g., event message 580, from various applications within information/call center 200 and stores the messages within memory 426, e.g., in database 429. Database 429 may contain multiple files indexed by call ID, each storing event messages pertaining to a respective call received in information/call center 200.

For example, when call tracker 235 receives event message 580, call tracker 235 determines that the message pertains to a new call and opens a new file within database 429 for the call. FIG. 6 illustrates a file 440 that may be created and maintained by call tracker 235 in database 429 to store event messages pertaining to Mr. Mozota's call, in accordance with an embodiment of the invention. Each record in file 440 contains the information received in an event message. For example, record 462 contains the information received in event message 580. Accordingly, columns 441-445 contains information corresponding to the information in, e.g., fields 481-485 of event message 580.

Supposing now that the operator is connected to the call and begins interacting with Mr. Mozota, software residing on operator terminal 220 transmits an event message to call tracker 235 indicating that an OWNER-state event has occurred, and specifying the event state value to be "Operator Terminal." Call tracker 235 receives the event message and stores it in folder 440, e.g., as record 463. As Mr. Mozota's call progresses, additional event messages may be generated upon the occurrence of selected events and transmitted to call tracker 235. Call tracker 235 records the information conveyed in each event message in a respective record in file 440.

Call tracker 235 maintains a file corresponding to a particular call, such as file 440, in database 429 through the life of the call, and for a predetermined period of time after the call is terminated. For example, file 440 may be maintained in database 429 through the life of Mr. Mozota's call, and up to ninety seconds after the call ends. After the ninety second period ends, call tracker 235 may delete file 440 from memory. Call tracker 235 determines that a call has terminated when an event message including a "CALLSTATE" event state indicator, and "END" as the event state value, is received. Such an event message is normally triggered by switching matrix platform 203 detecting an "off-hook" condition of the caller's call.

Figure 7:
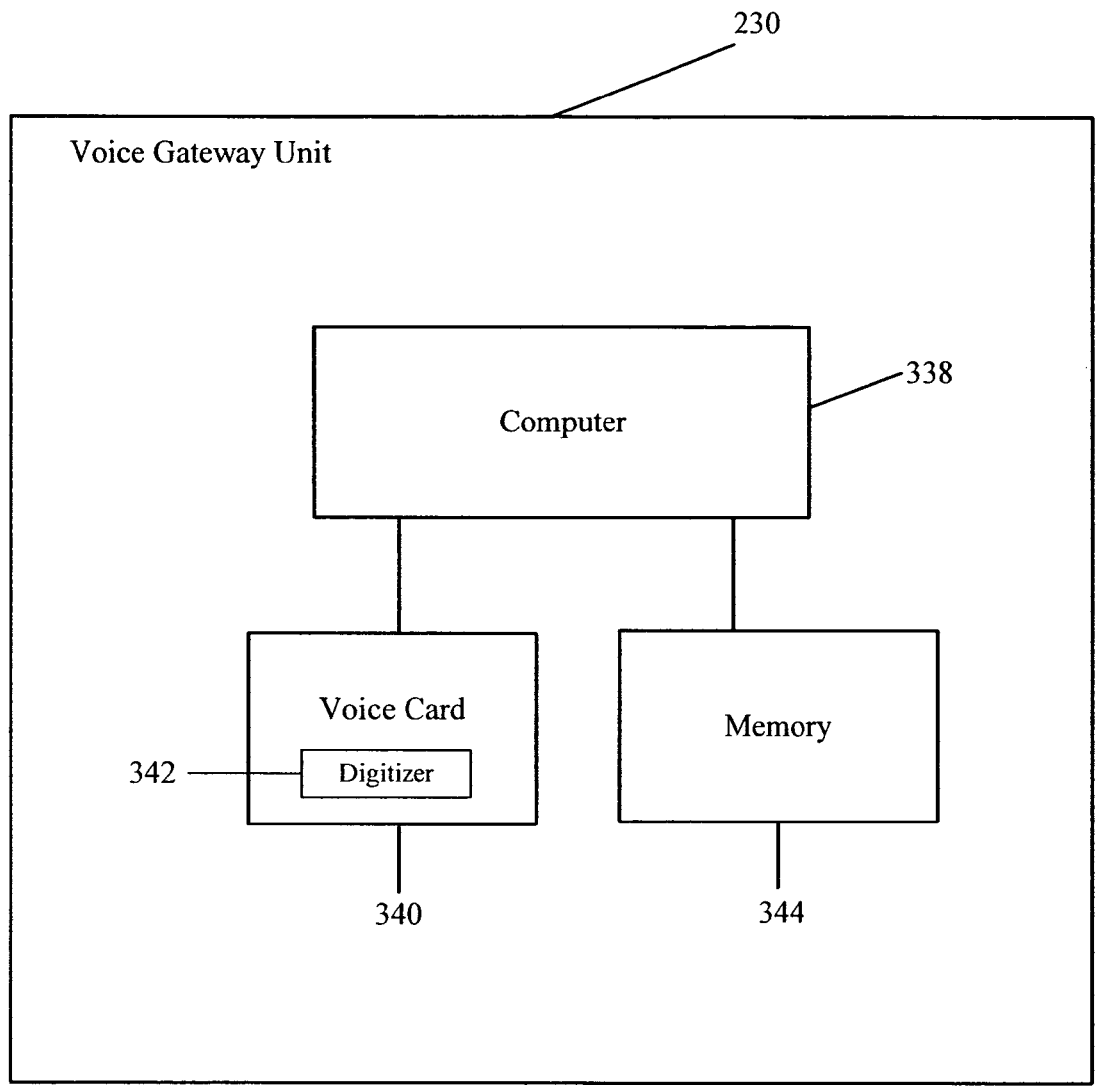
FIG. 7 illustrates components of a voice gateway unit (VGU), in accordance with an embodiment of the invention.

FIG. 7 illustrates voice gateway unit (VGU) 230 in accordance with the invention, which may comprise computer 338, such as a general purpose computer. One or more voice cards 340 and memory 344 are coupled to computer 338. Voice card 340 may include digitizer 342. Voice cards 340 serve as the interface between VGU 230 and the T1 span to switching matrix platform 203. One such voice card in server 230 monitors and controls communications over the T1 span. Its capabilities include telephone tone (e.g., DTMF or MF) detection and generation, voice recording and playback, and call progress analysis. VGU 230 may also contain a voice recognition device for receiving verbal input from a party connected thereto. As above, memory 344 may include disks, caches and volatile and non-volatile memory. VGU 230 is connected via data network 224 to computer 228 (to which it acts as a slave processor) and via one or more T1 links to switching matrix platform 203. Each VGU 230 when more than one is employed in information/call center 200, connects to switching matrix platform 203 via a separate T1 link. VGU 230 is employed to play the constantly repeated parts of an operator's speech, including, for example, the caller's desired telephone number where requested, and possibly other information. At appropriate stages in a call progression, switch matrix host computer 228 initiates a voice path connection between VGU 30 and switching matrix platform 203 such that the user, or the user and the operator, are able to hear whatever pre-recorded speech is played on that connection by VGU 230. Computer 228 then instructs VGU 230, via data network 224, what type of voice message to play, and passes data that enable VGU 230 to locate the appropriate voice message.

From time to time VGU 230 may receive a "service request" message from operator terminal 116 containing a uniform resource locator (URL) directed to a server and/or application within information/call center 200 such as, e.g., directions server 232, electronic messaging gateway 231, or concierge server 233. A URL contained in a service request message typically comprises a command, directed to a server and/or application residing with information/call center 200, to activate a requested service. The URL also comprises a call ID identifying a particular call currently received at switching matrix platform 203.

When VGU 230 receives a service request message, VGU 230 extracts the URL from the message and transmits the URL to the appropriate server or application. If necessary, the server or application, upon receiving the URL, accesses call tracker 235 and uses the call ID transmitted in the service request message to access the appropriate file in database 429 and retrieve any parameters required to provide the requested service.

After sending a URL to the appropriate server or application, VGU 230 accesses call tracker 235 to verify that the requested service has been initiated. For example, VGU 230 waits a predetermined period, e.g., on the order of seconds, and accesses database 429 in call tracker 235. VGU 230 examines the file corresponding to the current call to determine if a record has been registered therein indicating that the appropriate server has assumed "ownership" of the call. If VGU 230 determines that no such record has been registered, VGU 230 causes operator terminal 220 to be reconnected to the call.

For example, suppose that Mr. Mozota indicates to the operator that he wishes to use the voice email service to check the status of his email folder. The operator additionally ascertains that Mr. Mozota wishes to hear information pertaining to email messages received in his email folder between June 21, YYYY and June 23, YYYY, inclusive. The operator accordingly selects the system's voice email service by, e.g., selecting an appropriate button on a GUI displayed on terminal 220. The operator additionally enters parameters pertaining to Mr Mozota's request—specifically, that a time range message filter should be applied such that only email messages received between 00:00:00 on June 21, YYYY and 23:59:59 on June 23, YYYY are presented to Mr. Mozota. Mr. Mozota's email access information, i.e., addresses, usernames, passwords, etc., necessary to access his email accounts is retrieved from his email folder. Alternatively, the operator may receive the required access information directly from Mr. Mozota. In this example, Mr. Mozota's access information includes an address of his email account (Address1), and an associated username ("Username1") and password ("Password1").

Figure 8:
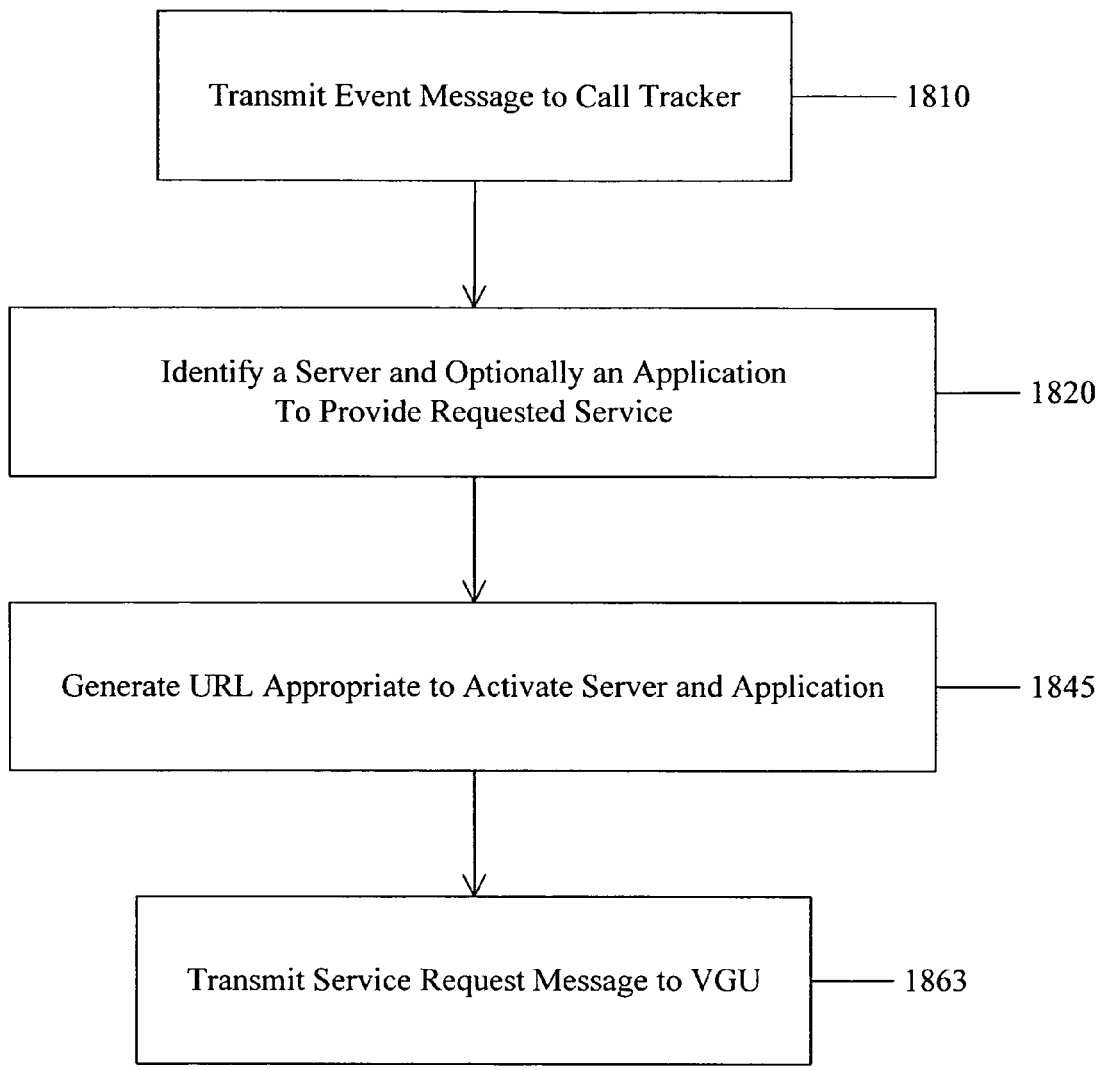
FIG. 8 is a flowchart depicting a routine for entering a service request, in accordance with an embodiment of the invention.
Figure 9:
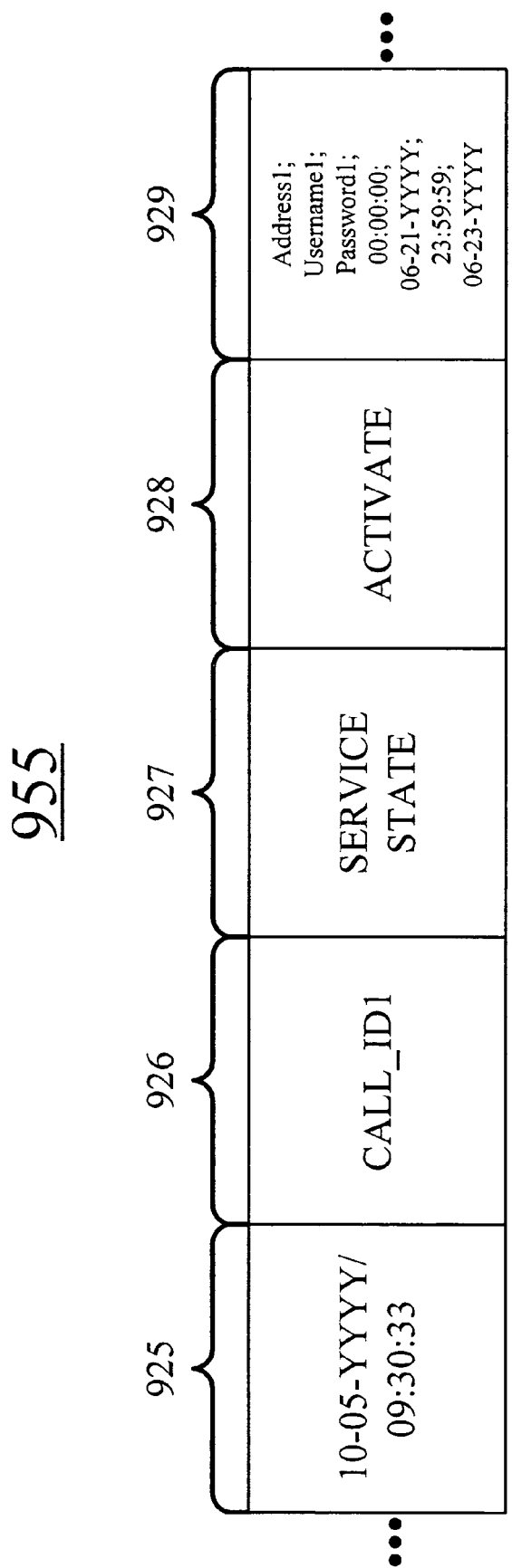
FIG. 9 illustrates an example of an event message, in accordance with an embodiment of the invention.

Operator terminal 220 generates a service request based on the information input by the operator. FIG. 8 is a flowchart depicting a routine for generating a service request, in accordance with an embodiment of the invention. At step 1810, operator terminal 220 transmits to call tracker 235 an event message, such as that shown in FIG. 9, conveying selected information and parameters pertaining to Mr. Mozota's service request. Fields 925 and 926 include, respectively, a timestamp indicating when the event message is created ("10-05-YYYY/09:30:33"), and the call ID ("CALL_ID1") associated with Mr. Mozota's call. Field 927 includes an event state indicator, in this instance "SERVICESTATE," indicating that a service-related event has occurred. In this instance, the operator has initiated a service request at terminal 220; accordingly field 928 includes the event state value "Activate." Field 929 contains parameters required to implement the requested service. In this example, the parameters in field 929 contains access information pertaining to Mr. Mozota's email accounts, including "Address1," "Username1," and "Password1." Field 929 also includes parameters specifying Mr. Mozota's desired time range ("00:00:00," "06-21-YYYY," "23:59:59," "06-23-YYYY").

At step 1820, operator terminal 220 identifies, based on information input by the operator, a particular server within information/call center 200 to be activated to respond to Mr. Mozota's needs, which is in this instance electronic messaging gateway 231. Operator terminal 220 may additionally identify a relevant application residing on the server, in this instance the time range message filter application.

At step 1845, operator terminal 220 additionally generates a URL comprising addresses and commands necessary to activate the appropriate server and application. FIG. 10 illustrates an example of a URL that may be generated by terminal 220 in this instance. URL 805 comprises seven fields 832, 835, 838, 842, 845, 848, and 849. Field 832 specifies the network on which the desired server and application reside—in this instance "network1," which may represent network 224, for example. Field 835 contains a data string representing the desired server, in this instance "emgateway," representing electronic messaging gateway 231. Field 838 and field 842, respectively, contain a "read_email" command, and an additional command, "time_range_filter," collectively indicating that Mr. Mozota wishes to hear email messages received within a time range. Field 845 contains the call identifier, "CALL$_{13}$ ID1," associated with Mr. Mozota's call. Fields 848 and 849 include, respectively, the date and time information from the timestamp contained in event message 955 (shown in FIG. 8), which was transmitted to call tracker 235 to convey information pertaining to Mr. Mozota's service request.

Figure 11:
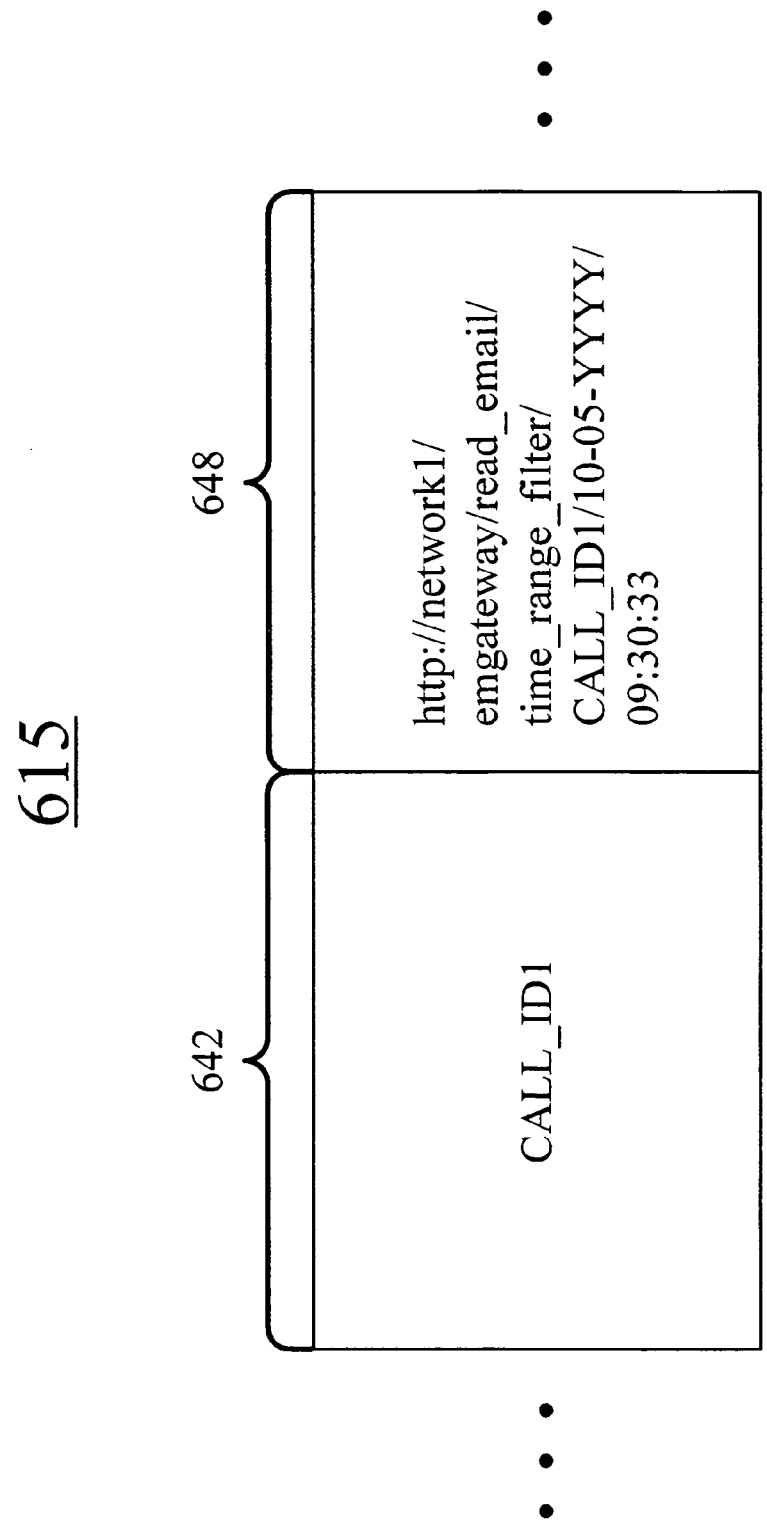
FIG. 11 illustrates a service request message, in accordance with an embodiment of the invention.

Returning to FIG. 8, at step 1863 operator terminal 220 transmits a service request message to VGU 230. FIG. 11 illustrates a service request message 615, which includes, among others, fields 642 and 648. Field 642 contains the call ID ("CALL_ID1") associated with the call, i.e., Mr. Mozota's call. Field 648 contains a copy of URL 805.

Figure 12:
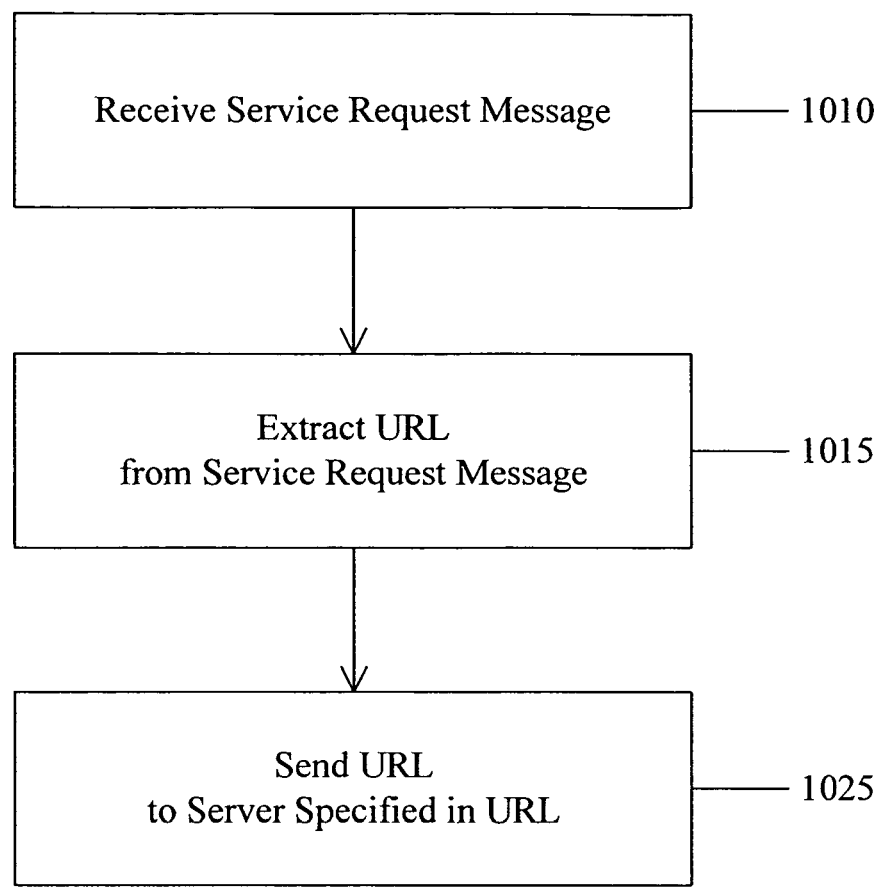
FIG. 12 is a flowchart depicting a routine for activating a requested service, in accordance with an embodiment of the invention.

VGU 230 receives service request message 615 and, in response, activates the requested service, and transmits to call tracker 235 an event message indicating an initiation of the requested service, resulting in record 464 in file 440. FIG. 12 is a flowchart depicting a routine for activating a requested service, in accordance with an embodiment of the invention. VGU 230 receives service request message 615 at step 1010. At step 1015, VGU 230 extracts URL 805 (from field 648)

and determines which server and/or application are specified in the URL. In this instance URL 805 specifies electronic messaging gateway 231, and the time range message filter application operating thereon. At step 1025, VGU 230 sends URL 805 to electronic messaging gateway 231, thereby instructing gateway 231 to activate the voice email service and time range message filter application.

It should be noted that in alternative embodiments, parameters may be transferred from operator terminal 220 to the appropriate server using other means (instead of being included in URL 805). For example, in one embodiment utilizing the well-known Intercall Switch Operating System (ISOS), the call identifier, and the date and time information specified in fields 845, 848 and 849 of URL 805, as well as other parameters may be transferred via background communications using sockets. In yet other embodiments, proprietary protocols and command/data structures may be utilized to transfer parameters to a server selected to provide a given service.

After sending URL 805 to electronic messaging gateway 231, VGU 230 accesses call tracker 235 to verify that the requested service has been initiated. In this instance, VGU 230 waits a few seconds, and accesses database 429 in call tracker 235. VGU 230 examines file 440 identified by "call_ID1" in field 642 to determine if a record comprising an "OWNER" event state indicator and "Electronic Messaging Gateway" event state value has been recorded subsequent to record 464. If VGU 230 determines that no such record has been registered, VGU 230 concludes that an error has occurred preventing gateway 231 from providing the requested service, and signals platform 203 to reconnect the call to an operator telephone 218 and terminal 220. An operator may then interact with Mr. Mozota to further assist him.

Figure 13:
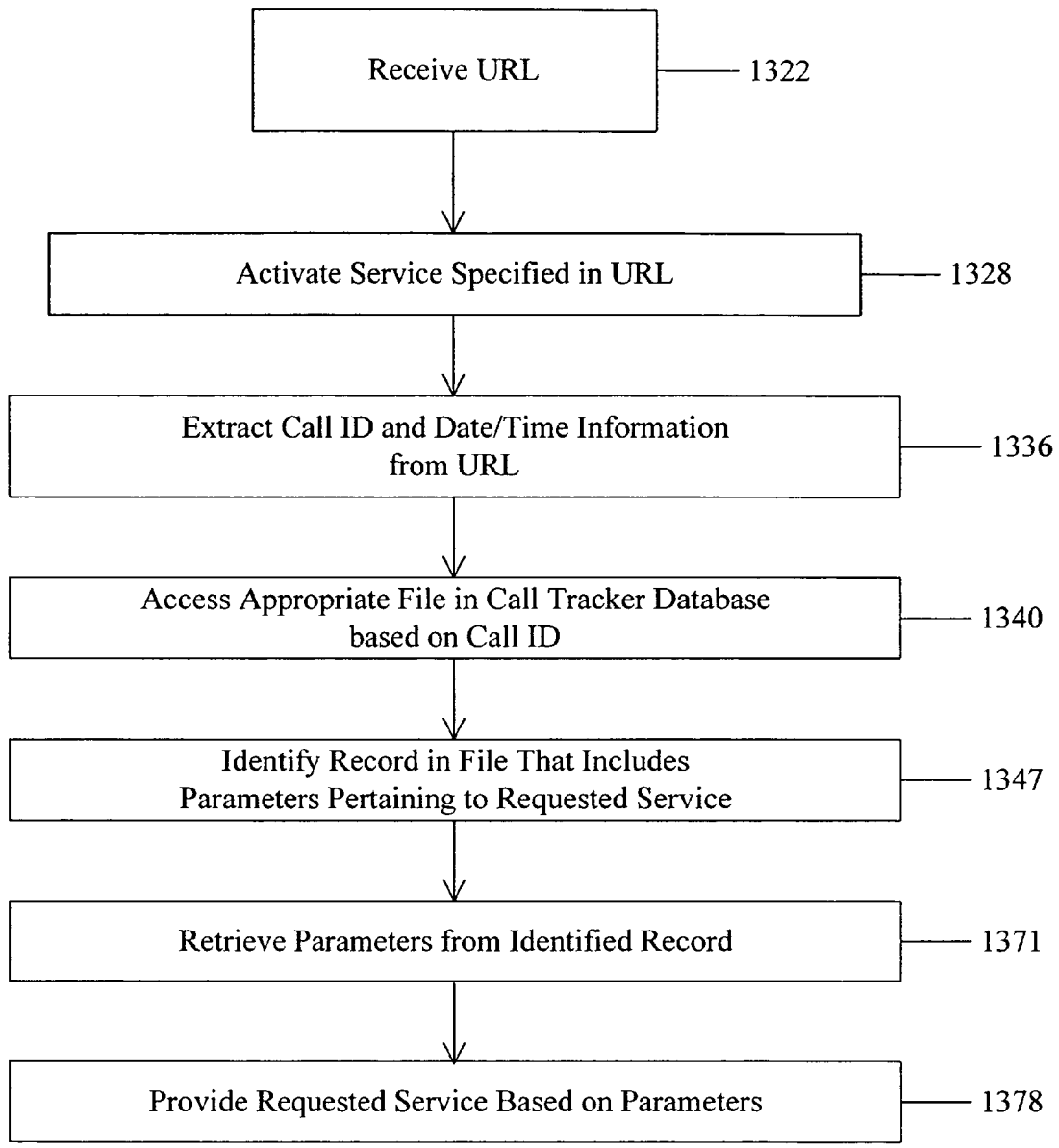
FIG. 13 is a flowchart depicting a routine for providing a requested service, in accordance with an embodiment of the invention.

Suppose electronic messaging gateway 231 has no problem receiving URL 805 and providing the service specified therein. FIG. 13 is a flowchart depicting a routine performed by gateway 231 to provide the requested service, in accordance with an embodiment of the invention. After receiving URL 805 (at step 1322), gateway 231 reads the commands therein. Referring to URL 805 of FIG. 10, gateway 231 reads fields 838 and 842 and, at step 1328, activates the appropriate email routine for downloading and reading email messages, and a time range message filter application. Gateway 231 transmits to call tracker 235 an event message comprising the event state indicator "OWNER" and the event state value "Electronic Messaging Gateway," indicating that gateway 231 has assumed responsibility for interacting with Mr. Mozota. Referring again to FIG. 6, call tracker 235 receives this event message and stores the information conveyed therein in, e.g., record 465.

In accordance with an embodiment of the invention, gateway 231 accesses call tracker 235 to retrieve the parameters necessary to provide the requested service to Mr. Mozota. To that end, gateway 231 at step 1336 extracts the call ID data from field 845 of URL 805, and the date and time data from fields 848 and 849. Gateway 231 utilizes the call ID data taken from URL 805 to identify and access file 440 (shown in FIG. 6) in call tracker 235. Referring also to FIG. 6, gateway 231 at step 1347 examines column 445 to identify a record having a timestamp that matches the date and time data from URL 805. In this instance, gateway 231 identifies record 464. Accordingly, gateway 231 retrieves the parameters stored in record 464 (step 1371). Specifically, gateway 231 retrieves "Address1," "Username1," and "Password1" for access to Mr. Mozota's email account, and "00:00:00," "06-21-YYYY," "23:59:59," and "06-23-YYYY" for the time range filter.

Gateway 231 then connects Mr. Mozota's call thereto to provide the requested voice email service to Mr. Mozota based on the retrieved parameters from file 440, as indicated at step 1378. Gateway 231 additionally transmits to call tracker 235 another event message comprising the event state indicator "SERVICESTATE" and the event state value "Start," indicating that the voice email service has begun. Referring yet again to FIG. 6, call tracker 235 receives this event message and stores the information therein in record 466.

Supposing that Mr. Mozota subsequently chooses to end the voice email service and return to the operator, e.g., by pressing a predetermined key on his telephone, gateway 231 disconnects from the call and transmits to call tracker 235 an event message comprising a "SERVICESTATE" event state indicator, and an "END" event state value, indicating that the service has ended. When call tracker 235 receives the event message, the information stored therein is stored in, e.g., record 467. An operator at operator telephone 218 and terminal 220 is then reconnected to the call. Terminal 220 accordingly transmits to call tracker 235 an event message containing an "OWNER" event state indicator, and an "Operator Terminal" event state value, indicating that operator terminal 220 has once again assumed responsibility for interacting with Mr. Mozota. When call tracker 235 receives the event message, the information contained therein is stored in, e.g., record 468. Based on the disclosure heretofore, a person skilled in the art will appreciate that additional records pertaining to Mr. Mozota's call are generated from time to time to record selected events as the call progresses, which are stored in file 440, as well.

As discussed above, call tracker 235 maintains a file for each information assistance call, such as file 440, in database 429 at least through the life of the call. By analyzing information in such a file, the status of the call can be ascertained. For example, in the immediately preceding example, after terminal 220 again assumes responsibility for interacting with Mr. Mozota and transmits to call tracker 235 an event message containing an "OWNER" event state indicator, terminal 220 may query call tracker 235 to provide the contents of file 440 to allow an operator (who may be different from the first operator connected to Mr. Mozota) to view the history of Mr. Mozota's call. The contents of file 440 (or a summary by call tracker 235 after analyzing the contents) may be displayed to the operator on terminal 220, enabling the operator to view records 462-468 and as a result be familiar with the history of the call. After viewing the contents of file 440 (or the summary thereof), the operator may provide personalized interaction with Mr. Mozota by asking, for example, "I see that you have accessed your email folder. Is there anything else that I can help you with?"

Providing to an operator the ability to view a call's history is particularly useful in providing a sense of continuity to a user when a communication error occurs. Let us return to the previous example where VGU 230 transmits URL 805 to electronic messaging gateway 231, accesses call tracker 235 to verify that the requested service has been initiated, and finds that no record comprising an "OWNER" event state indicator and "Electronic Messaging Gateway" event state value was recorded subsequent to record 464. In other words, in that hypothetical example gateway 231 failed to exercise control over the call, and therefore an OWNER state record was never registered in file 440. Upon determining such a failure, VGU 230 causes reconnection of the call to operator phone 218 and terminal 220. Operator terminal 220 accordingly reconnects to the call and queries call tracker 235 to provide the contents of file 440 to allow an operator (who may be different from the first operator connected to Mr. Mozota) to view the history of Mr. Mozota's call. The contents of file 440 (or a summary by call tracker 235 after analyzing the contents) may be displayed to the operator on terminal 220. In this instance, file 440 includes only records 462-464, since gateway 231 failed to connect to the call and assert ownership. Accordingly, the operator may, after viewing the contents of file 440 (or the summary thereof), provide personalized interaction with Mr. Mozota by asking, for example, "I see that you attempted to access your email folder. There appears to have been a problem with the voice email service. We apologize for the inconvenience. Would you like to try again later, or is there anything else that I can help you with?"

In yet another embodiment, an operator may record via terminal 220 other types of information received from a caller, such as, e.g., notes and observations about the caller's level of cooperation. Notes and observations recorded by the operator are included in an event message and transmitted to call tracker 235, where they are stored in the appropriate file.

The foregoing merely illustrates the principles of the invention. It will thus be appreciated that those skilled in the art will be able to devise numerous other arrangements that embody the principles of the invention and are thus within the spirit and scope of the invention, which is defined by the claims below.

Finally, information/call center 200 and its components are disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method for use in a system for providing an information assistance service, comprising:
   receiving an information assistance call including an identifier from a caller;
   storing one or more parameters in association with the identifier of the call in a first device in the system;
   eliciting from the caller a desired information assistance service, the desired information assistance service being associated with one or more of said parameters, said parameters required to provide the requested service;
   sending a message to a second device in the system, the message including a directive in the form of a uniform resource locator (URL) addressed to a third device in the system for providing the desired information assistance service, the directive including the identifier;
   disseminating by the second device the directive addressed to the third device; and in response to the directive, the third device using the URL of said directive retrieving from the first device the one or more parameters based on the identifier in the directive, and
   providing by the second device the desired information assistance service based on the one or more parameters.

2. The method of claim 1 wherein the first device comprises a database.

3. The method of claim 1 wherein the URL identifies an application.

4. The method of claim 1 wherein the URL includes an address of the third device.

5. The method of claim 1 wherein the desired information assistance service involves a voice presentation of information to the caller.

6. The method of claim 5 wherein the second device delivers the voice presentation.

7. The method of claim 5 wherein the desired information assistance service includes a service providing travel directions.

8. The method of claim 5 wherein the desired information assistance service includes a voice email service.

9. The method of claim 8 wherein the one or more parameters specify a time range within which email to the caller was received.

10. The method of claim 1 wherein the desired information assistance service is elicited from the caller by an operator.

11. A system for providing an information assistance service, comprising:
    at least first and second devices;
    an interface for receiving an information assistance call including an identifier from a caller,
    storage for storing the one or more parameters in association with the identifier of the call;
    said system configured to elicit a desired information assistance from the caller, the desired information assistance service being associated with one or more of said parameters, said parameters required to provide the requested service; and
    a message being sent to the first device, the message including a directive in the form of a uniform resource locator (URL) addressed to the second device for providing the desired information assistance service, the directive including the identifier,
    the second device disseminating the directive addressed to the third device; wherein in response to the directive, the third device using the URL of said directive retrieving from the first device the one or more parameters based on the identifier in the directive, and providing by the first device the desired information assistance service based on the one or more parameters.

12. The system of claim 11 wherein the storage includes a database.

13. The system of claim 11 wherein the URL identifies an application.

14. The system of claim 11 wherein the URL includes an address of the third device.

15. The system of claim 11 wherein the desired information assistance service involves a voice presentation of information to the caller.

16. The system of claim 15 wherein the first device delivers the voice presentation.

17. The system of claim 15 wherein the desired information assistance service includes a service providing travel directions.

18. The system of claim 15 wherein the desired information assistance service includes a voice email service.

19. The system of claim 18 wherein the one or more parameters specify a time range within which email to the caller was received.

20. The system of claim 19 wherein the desired information assistance service is elicited from the caller by an operator.

* * * * *